June 4, 1968 R. C. HEIN 3,386,745

SOIL-PIPE GASKET

Filed Aug. 8, 1966

INVENTOR.
ROY C. HEIN
BY *Gordon C. Clark*

ATTORNEY 3,386,745
SOIL-PIPE GASKET
Roy C. Hein, Kent, Ohio, assignor to Hamilton Kent Manufacturing Co., Kent, Ohio, a corporation of Ohio
Filed Aug. 8, 1966, Ser. No. 570,782
7 Claims. (Cl. 277—168)

This invention relates to an improved extruded, generally cylindrical gasket for use in soil pipe, and the combination of the gasket compressed between the telescoped ends of two sections of soil pipe.

Soil pipe is cast-iron. It is operated under a low pressure and is required to withstand hydrostatic pressure of 50 pounds per inch before installation. It is necessary that a gasket between two lengths of such pipe resist the low pressure of material flowing through the pipe.

The invention is applicable to soil pipes of the bell-and-spigot type. An indentation is provided around the inner surface of the bell of such pipe near its end. The gasket of this invention is provided on its outer surface with a protuberance which fits into this indentation, and usually one or more smaller proturberances which are sealed against the inner surface of the bell when two pipe sections are assembled.

The inner end of the gasket, i.e. the end exposed to the contents of the pipe, is of the clothespin type, being formed with two flared end portions between which the contents of the pipe tend to enter, forcing the flaring portions outwardly, thereby increasing the pressure of these gasket portions against the respective pipe sections.

The innermost of the two flared portions at the clothespin end of the gasket is humped on its outer surface, and the inner surfaces of these portions bulge toward one another. When the spigot of the inner pipe section presses on the hump, the flared portion teeters causing the tip of this portion to flare inwardly and press against the spigot.

The inner surface gasket is provided with one or more protuberances which make an improved seal with the spigot of a pipe section when it is telescoped within the bell of another pipe section.

There are usually several openings through the body of the gasket which soften the gasket so that it flows under compression to form a tight seal between the two pipe sections. These openings are advantageously located in the same radial planes as the protuberances on the inner and outer surfaces of the gasket.

The gasket is further described in connection with the accompanying drawings, in which—

Figure 1:
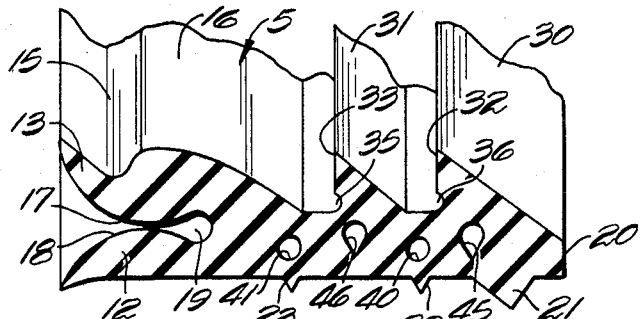
FIGURE 1 is an axial section through the gasket.

The drawing illustrates the use of the gasket 5 between the spigot 7 of one section of soil pipe and the bell 8 of another section. The gasket is of rubber or other elastomeric material. There is an annular indentation 10 in the inner surface of the bell 8, a short distance from its outer end.

The gasket is of the clothespin type and is formed at its inner end with two oppositely flaring portions 12 and 13, the portion 12 flaring outwardly and the portion 13 flaring inwardly. The surface of the gasket adjacent the bell usually is relatively flat except that its tip flares outwardly. The inner surface of the gasket is usually indented at 15 near the tip 13 and is provided with a hump 16 immediately inwardly of this indentation. The inner surfaces of these outwardly flaring portions of the clothespin end bulge toward one another at 17 and 18 at a position axially inward of the hump, so that when the spigot 7 is telescoped into the bell 8 and applies pressure to the hump 16 these bulges are squeezed together causing the tip 13 to teeter inwardly. As spigot 7 reaches its innermost portion, the tip 13 is pressed against it and forms a tight seal with it. The opening between the two portions of the clothespin end usually widens inwardly of the two bulges to form the rounded portion 19. As liquid under pressure contacts the inner surfaces of the flared tips 12 and 13, it forces the portions of the clothespin apart and into pressured contact with the respective pipe sections and liquid entering the opening 19 presses the portions of the gasket outward forming a tight seal which locks the gasket in position.

The other end of the gasket 20 is usually blunt, although its shape is immaterial. A short distance from this end, on the outer surface of the gasket, there is a relatively large protuberance 21 and spaced from this are smaller protuberances 22 and 23. These are shown as being triangular in section, although they may be rounded or any other suitable shape. In utilizing the gasket, the larger protuberance 21 is located in the depression 10. When pressure is applied it tends to fill the depression. The smaller protuberances 22 and 23 contact the inner surface of the bell and help hold the gasket in position at all times, compensating for irregularities in the pipe surface, and when compressed, they are flattened out making tight seals with the bell. All of these protuberances, 21, 22 and 23, extend through the entire circumference of the gasket.

On the inner surface of the gasket, there are inwardly projecting protuberances; and the inner surfaces of these generally slant toward the inner end of the gasket so that when the spigot 7 contacts them they are easily pressed away from it and form a tight seal with the spigot. The drawings show two such inner protuberances, 30 and 31, and these are located at positions axially intermediate to the protuberances 22 and 23 on the outer surface of the gasket, and the slope of the protuberance 30 is preferably longer than the slope of 31 to facilitate telescoping the spigot into the bell. The walls 32 and 33 of the protuberances nearest the flaring tips 12 and 13 are shown as radial, but they may be slanted somewhat in one direction or the other. These walls, at their respective bases, are formed with rounded indentations 35 and 36, which facilitate the inward folding of the protuberances as the pipes are telescoped.

Specifications for gaskets for soil pipe usually require that it be made of 70 durometer rubber. (ASTM–D676). Usually the gaskets of this invention will be of this hardness, but hardnesses as low as about 50 durometer may be used, and the rubber may be harder than 70 durometer. To facilitate a gasket of such hardness filling the space between the pipe sections and forming a tight seal, distortional flow is necessary so openings are formed in the gasket which extend around the entire circumference of the gasket. These openings may be rounded or pointed, and the drawings show two circular openings 40 and 41 located radially inward from the protuberances 22 and 23 and two openings 45 and 46 located radially outward from the protuberances 30 and 31 which are preferably of teardrop cross section because of the greater mass of these protuberances.

As the spigot 7 is telescoped into the bell 8, the protuberances 30 and 31 are flattened toward the outer end of the gasket, and pressure is applied to the hump 16 causing the tip 13 to flare outwardly. On the outer wall of the gasket the protuberance 21 is flattened into the indentation 10 and tends to fill it, and the protuberances 22 and 23 are flattened somewhat into sealing contact with the inner surface of the bell.

Figure 2:
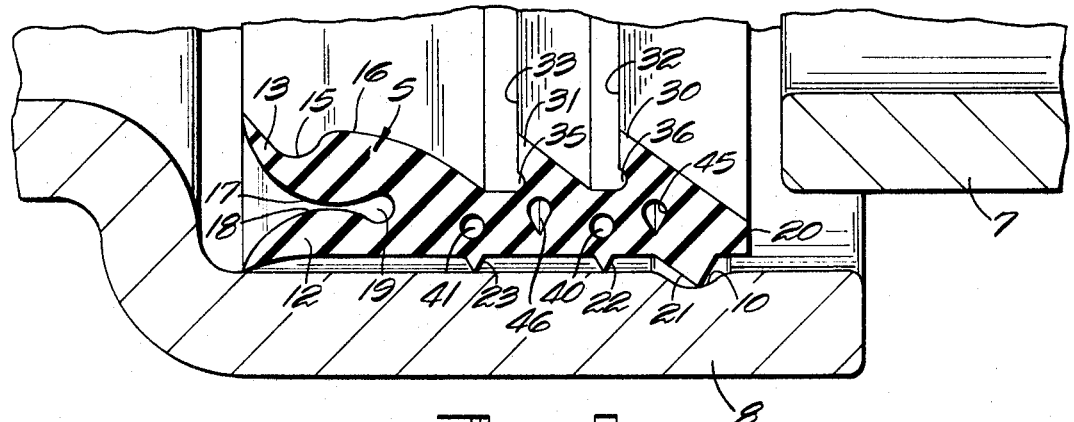
FIGURE 2 is a similar section through a gasket located in the bell of one section of pipe and showing a section of another pipe about to be telescoped inside of the first-mentioned section.
Figure 3:
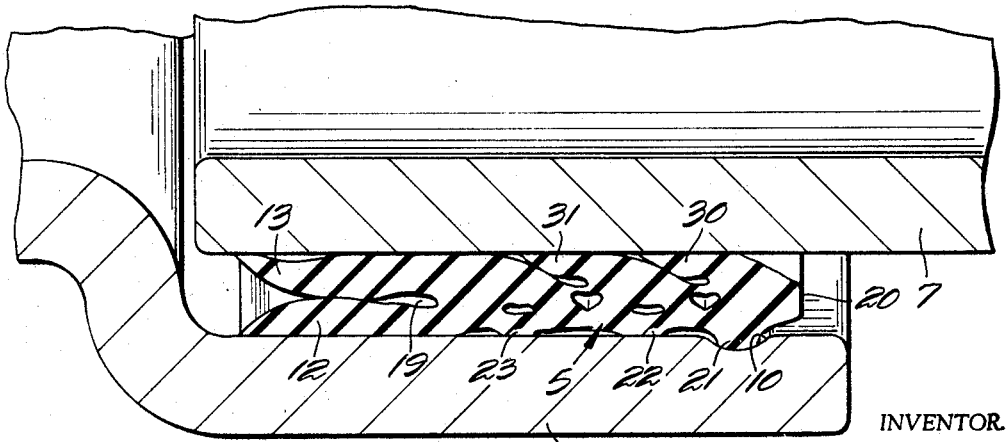
FIGURE 3 is a section through the two telescoped sections of the pipe with the gasket compressed between them.

The gasket is extruded as a long strip having the cross section shown in FIGURES 1 and 2. It may be two inches wide, for example, but its width will be varied to meet particular requirements. This strip is then cut to the required lengths and the two ends of each length are united, preferably by being vulcanized together.

The invention is covered in the claims which follow.

I claim:

1. An extruded, generally cylindrical gasket for use between two sections of soil pipe, each of which sections is provided at one end with a spigot and at the other end with a bell having an indentation in its inner surface near its outer end, which gasket is of the clothespin type with two portions at its inner end, the tips of which flare away from one another with a space between the portions which widens as the distance from the tips increases, a first protuberance on its outer surface near its outer end adapted to project into said indentation, and at least one protuberance on its inner surface, the inner surface of said last-mentioned protuberance slanting toward the inner end of the gasket with the bottom of its opposite surface indented to facilitate flexing, and at least one opening in the portion of the gasket from which the protuberances extend which opening extends through the entire circumference of the gasket and facilitates its flowing under compression.

2. The gasket of claim 1 in which there is at least one protuberance on the outer surface of the gasket in addition to the protuberance which fits into the indentation.

3. The gasket of claim 2 in which there are two smaller protuberances on the outer surface of the gasket, and there are two protuberances on the inner surface of the gasket with their portions of smallest diameter located axially between the respective protuberances on the outer surface of the gasket, said protuberances on the inner surface of the gasket each being of greater height than the protuberance which fits into the indentation.

4. The gasket of claim 3 in which there are four openings which extend through the entire circumference of the gasket, two of them being circular and located radially inward of the two smaller projections on the outer wall of the gasket, the other two being tear-shaped and pointing outwardly, and located radially outward of the inwardly directed protuberances.

5. In combination, (1) two sections of bell-and-spigot soil pipe with the spigot end of one telescoped in the bell end of the other, there being an indentation on the inner wall of the bell near its outer end and (2) the gasket of claim 1 compressed between said pipe sections with the larger protuberance on the outer surface of the gasket squeezed in said indentation.

6. The combination of claim 5 in which the gasket is the gasket of claim 2.

7. The combination of claim 5 in which the gasket is the gasket of claim 4.

References Cited

UNITED STATES PATENTS

| | | | |
|---|---|---|---|
| 2,230,725 | 2/1941 | Nathan | 277—205 X |
| 3,173,699 | 3/1965 | Nathan | 277—206 |
| 3,325,174 | 6/1967 | Weaver | 277—168 |

SAMUEL ROTHBERG, *Primary Examiner.*